United States Patent
Kim et al.

(10) Patent No.: US 10,841,973 B2
(45) Date of Patent: Nov. 17, 2020

(54) METHOD FOR TRANSCEIVING SIGNAL IN WIRELESS LAN SYSTEM AND DEVICE THEREFOR

(71) Applicant: LG ELECTRONICS INC., Seoul (KR)

(72) Inventors: Jinmin Kim, Seoul (KR); Sungjin Park, Seoul (KR); Kyungtae Jo, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/319,257

(22) PCT Filed: Jun. 28, 2017

(86) PCT No.: PCT/KR2017/006824
§ 371 (c)(1),
(2) Date: Jan. 18, 2019

(87) PCT Pub. No.: WO2018/016761
PCT Pub. Date: Jan. 25, 2018

(65) Prior Publication Data
US 2019/0281657 A1 Sep. 12, 2019

Related U.S. Application Data

(60) Provisional application No. 62/364,329, filed on Jul. 20, 2016, provisional application No. 62/384,201, filed on Sep. 7, 2016.

(51) Int. Cl.
*H04W 80/08* (2009.01)
*H04B 7/0452* (2017.01)
(Continued)

(52) U.S. Cl.
CPC .......... *H04W 80/08* (2013.01); *H04B 7/0452* (2013.01); *H04L 27/26* (2013.01); *H04W 28/06* (2013.01); *H04W 84/12* (2013.01)

(58) Field of Classification Search
CPC .................................................... H04W 80/08
See application file for complete search history.

(56) References Cited

U.S. PATENT DOCUMENTS

2012/0257606 A1 10/2012 Sampath et al.
2014/0369302 A1 12/2014 Abraham et al.
(Continued)

FOREIGN PATENT DOCUMENTS

WO 2016053024 4/2016

OTHER PUBLICATIONS

PCT International Application No. PCT/KR2017/006824, Written Opinion of the International Searching Authority dated Nov. 29, 2017, 31 pages.

*Primary Examiner* — Andrew Lai
*Assistant Examiner* — Andrew C Lee
(74) *Attorney, Agent, or Firm* — Lee, Hong, Degerman, Kang & Waimey PC

(57) ABSTRACT

The present specification relates to a method for transceiving a signal by a station in a wireless LAN (WLAN) system and, more particularly, provides a method for transmitting or receiving a signal on the basis of a header field, which is differently configured depending on whether a Physical Protocol Data Unit (PPDU) format transmitted by a station is a multiuser-multiple input multiple output (MU-MIMO) format or a frequency division multiple access (FDMA) format, and a device therefor.

5 Claims, 10 Drawing Sheets

| Field name | Num. of bits | Description |
|---|---|---|
| SU/MU format | 1 | |
| Channel aggregation | 1 | |
| MU-MIMO/FDMA | 1 | Set to 0 for a MU-MIMO PPDU. Set to 1 for a FDMA PPDU. |
| BW | 8 | |
| Primary channel | 3 | |
| GI/CP length | 2 | |
| Beamformed | 1 | |
| Short/Long LDPC | 1 | |
| STBC | 1 | |
| SS Descriptor set 0 | 9 | Describes the SS assignment to the first STA addressed within the MU PPDU. |
| SS Descriptor set 1 | 9 | Describes the SS assignment to the second STA addressed within the MU PPDU |
| SS Descriptor set 2 | 9 | Describes the SS assignment to the third STA addressed within the MU PPDU. |
| SS Descriptor set 3 | 9 | Describes the SS assignment to the fourth STA addressed within the MU PPDU. |
| SS Descriptor set 4 | 9 | Describes the SS assignment to the fifth STA addressed within the MU PPDU. |
| SS Descriptor set 5 | 9 | Describes the SS assignment to the sixth STA addressed within the MU PPDU. |
| SS Descriptor set 6 | 9 | Describes the SS assignment to the seventh STA addressed within the MU PPDU. |
| SS Descriptor set 7 | 9 | Describes the SS assignment to the eighth STA addressed within the MU PPDU. |
| Reserved | 5 | |
| CRC | 16 | |
| Total | 112 | |

(51) Int. Cl.
*H04L 27/26* (2006.01)
*H04W 28/06* (2009.01)
*H04W 84/12* (2009.01)

(56) References Cited

U.S. PATENT DOCUMENTS

| | | | |
|---|---|---|---|
| 2016/0021678 A1 | 1/2016 | Merlin et al. | |
| 2016/0087775 A1* | 3/2016 | Hedayat | H04L 1/12 |
| | | | 370/329 |
| 2016/0119933 A1* | 4/2016 | Merlin | H04W 72/0453 |
| | | | 370/312 |
| 2016/0254884 A1* | 9/2016 | Hedayat | H04B 7/063 |
| | | | 370/329 |
| 2016/0295513 A1* | 10/2016 | Moon | H04B 7/0697 |
| 2016/0302229 A1* | 10/2016 | Hedayat | H04L 69/324 |
| 2016/0315681 A1* | 10/2016 | Moon | H04B 7/0452 |
| 2016/0323424 A1* | 11/2016 | Merlin | H04L 5/0048 |
| 2016/0381688 A1* | 12/2016 | Hedayat | H04W 74/0816 |
| | | | 370/329 |
| 2017/0019306 A1* | 1/2017 | Van Zelst | H04L 1/0079 |

* cited by examiner

| CH 1 | L - STF | L - CE | L - Header | ay Header A | ay STF | ay CE | ay Header B | ay payload |
|---|---|---|---|---|---|---|---|---|
| | GF-STF | GF-CE | | | | | | |
| CH 2 | L - STF | L - CE | L - Header | ay Header A | | | | |

(L: legacy, GF: gap filling, ay: 802.11ay)

FIG. 11

| Field name | Num. of bits | Description |
|---|---|---|
| SU/MU format | 1 | |
| Channel aggregation | 1 | |
| MU-MIMO/FDMA | 1 | Set to 0 for a MU-MIMO PPDU. Set to 1 for a FDMA PPDU. |
| BW | 8 | |
| Primary channel | 3 | |
| GI/CP length | 2 | |
| Beamformed | 1 | |
| Short/Long LDPC | 1 | |
| STBC | 1 | |
| SS Descriptor set 0 | 9 | Describes the SS assignment to the first STA addressed within the MU PPDU. |
| SS Descriptor set 1 | 9 | Describes the SS assignment to the second STA addressed within the MU PPDU. |
| SS Descriptor set 2 | 9 | Describes the SS assignment to the third STA addressed within the MU PPDU. |
| SS Descriptor set 3 | 9 | Describes the SS assignment to the fourth STA addressed within the MU PPDU. |
| SS Descriptor set 4 | 9 | Describes the SS assignment to the fifth STA addressed within the MU PPDU. |
| SS Descriptor set 5 | 9 | Describes the SS assignment to the sixth STA addressed within the MU PPDU. |
| SS Descriptor set 6 | 9 | Describes the SS assignment to the seventh STA addressed within the MU PPDU. |
| SS Descriptor set 7 | 9 | Describes the SS assignment to the eighth STA addressed within the MU PPDU. |
| Reserved | 5 | |
| CRC | 16 | |
| Total | 112 | |

FIG. 12

| Field name | Num. of bits | Description |
|---|---|---|
| SU/MU format | 1 | |
| Channel aggregation | 1 | |
| MU-MIMO/FDMA | 1 | Set to 0 for a MU-MIMO PPDU. Set to 1 for a FDMA PPDU. |
| BW | 8 | |
| Primary channel | 3 | |
| GI/CP length | 2 | |
| Short/Long LDPC | 1 | |
| STBC | 1 | |
| RA Descriptor 0 | 15 | Describes the channel assignment to the first STA addressed within the MU PPDU |
| RA Descriptor 1 | 15 | Describes the channel assignment to the second STA addressed within the MU PPDU |
| RA Descriptor 2 | 15 | Describes the channel assignment to the third STA addressed within the MU PPDU |
| RA Descriptor 3 | 15 | Describes the channel assignment to the fourth STA addressed within the MU PPDU |
| Reserved | 18 | |
| CRC | 16 | |
| Total | 112 | |

METHOD FOR TRANSCEIVING SIGNAL IN WIRELESS LAN SYSTEM AND DEVICE THEREFOR

CROSS-REFERENCE TO RELATED APPLICATIONS

This application is the National Stage filing under 35 U.S.C. 371 of International Application No. PCT/KR2017/006824, filed on Jun. 28, 2017, which claims the benefit of U.S. Provisional Application No. 62/364,329, filed on Jul. 20, 2016, and 62/384,201, filed on Sep. 7, 2016, the contents of which are all hereby incorporated by reference herein in their entireties.

TECHNICAL FIELD

The present disclosure relates to a method for operating a station in a Wireless Local Area Network (WLAN) system, and more particularly, to methods of configuring a header field differently depending on whether a Physical Protocol Data Unit (PPDU) format, which is transmitted by a station in a WLAN system, is either a Multi User-Multiple Input Multi Output (MU-MIMO) format or a Frequency Division Multiple Access (FDMA) format and transmitting and receiving signals based on the header field and devices therefor.

BACKGROUND ART

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

Meanwhile, IEEE 802.11ad defines performance enhancement for high-speed throughput in the 60 GHz band, and IEEE 802.11ay, for introducing channel bonding and MIMO technology to IEEE 802.11ad systems for the first time, is being discussed.

DISCLOSURE OF THE INVENTION

Technical Task

In the 11ay system to which the present invention is applicable, when a station transmits a PPDU, a head field included in the PPDU can be differently configured depending on whether the PPDU is either an MU-MIMO format or an FDMA format.

Thus, the present invention not only defines how the header field is configured according to the format of the PPDU but proposes a method for transmitting and receiving signals based on the header field.

Technical Solution

In an aspect of the present invention, provided is a method of transmitting a signal to a plurality of second stations (STAs) by a first STA in a Wireless Local Area Network (WLAN) system. The method may include: transmitting, to the plurality of second STAs, a header field including an indicator indicating whether a transmitted Physical Protocol Data Unit (PPDU) is either a Multi User-Multiple Input Multi Output (MU-MIMO) format or a Frequency Division Multiple Access (FDMA) format; when the PPDU is the MU-MIMO format, transmitting the signal to the plurality of second STAs based on stream allocation information indicated by the header field; and when the PPDU is the FDMA format, transmitting the signal to the plurality of second STAs based on channel allocation information indicated by the header field.

In another aspect of the present invention, provided is a method of receiving a signal from a second station (STA) by a first STA in a Wireless Local Area Network (WLAN) system. The method may include: receiving, from the second STA, a header field including an indicator indicating whether a transmitted Physical Protocol Data Unit (PPDU) is either a Multi User-Multiple Input Multi Output (MU-MIMO) format or a Frequency Division Multiple Access (FDMA) format; when the PPDU is the MU-MIMO format, receiving the signal from the second STA based on stream allocation information indicated by the header field; and when the PPDU is the FDMA format, receiving the signal from the second STA based on channel allocation information indicated by the header field.

In a further aspect of the present invention, provided is a first station (STA) device for transmitting a signal in a Wireless Local Area Network (WLAN) system. The first STA device may include: a transceiver configured to transmit and receive signals to and from a plurality of second STAs with at least one Radio Frequency (RF) chain; and a processor connected to the transceiver and configured to process the signals transmitted and received to and from the plurality of second STAs. In this case, the processor may be configured to: transmit, to the plurality of second STAs, a header field including an indicator indicating whether a transmitted Physical Protocol Data Unit (PPDU) is either a Multi User-Multiple Input Multi Output (MU-MIMO) format or a Frequency Division Multiple Access (FDMA) format; when the PPDU is the MU-MIMO format, transmit the signal to the plurality of second STAs based on stream allocation information indicated by the header field; and when the PPDU is the FDMA format, transmit the signal to the plurality of second STAs based on channel allocation information indicated by the header field.

In a still further aspect of the present invention, provided is a first station (STA) device for receiving a signal in a Wireless Local Area Network (WLAN) system. The first STA device may include: a transceiver configured to transmit and receive signals to and from a second STA with at least one Radio Frequency (RF) chain; and a processor connected to the transceiver and configured to process the signals transmitted and received to and from the second STA. In this case, the processor may be configured to: receive, from the second STA, a header field including an indicator indicating whether a transmitted Physical Protocol Data Unit (PPDU) is either a Multi User-Multiple Input Multi Output (MU-MIMO) format or a Frequency Division Multiple Access (FDMA) format; when the PPDU is the MU-MIMO format, receive the signal from the second STA based on stream allocation information indicated by the header field; and when the PPDU is the FDMA format, receive the signal from the second STA based on channel allocation information indicated by the header field.

In this case, the indicator indicating whether the PPDU is either the MU-MIMO format or the FDMA format may have a size of 1 bit.

In addition, when the PPDU is the MU-MIMO format, the header field may include an SS Descriptor Set field for each of the plurality of second STAs, and the header field may include a maximum of 8 SS Descriptor Set fields.

In other words, the header field may include up to 8 SS Descriptor Set fields.

Moreover, when the PPDU is the MU-MIMO format, the header field may further include: an SU/MU field indicating whether the PPDU is either a Single-User (SU) PPDU or a Multi-User (MU) PPDU; a Primary Channel field indicating a primary channel; a Bandwidth field indicating a bandwidth; and a 16-bit Cyclic Redundancy Check (CRC).

Further, when the PPDU is the FDMA format, the header field may include a Channel Descriptor field for each of the plurality of second STAs, and the header field may include a maximum of 4 Channel Descriptor fields.

In this case, the Channel Descriptor field may include an 8-bit Association ID (AID) field and a 1-bit Beamformed field.

Additionally, when the PPDU is the FDMA format, the header field may further include: an SU/MU field indicating whether the PPDU is either a Single-User (SU) PPDU or a Multi-User (MU) PPDU; and a 16-bit Cyclic Redundancy Check (CRC).

Advantageous Effects

With the above-described configuration, an STA according to the present invention may separately define a header field in a PPDU for MU-MIMO and a header field in a PPDU for FDMA. By doing so, the STA may transmit different information through the header fields to an 11ay receiving STA. In other words, by transmitting information optimized for each case through a corresponding header field to an 11ay receiving STA, the STA according to the present invention can achieve signal transmission and reception optimized for each case.

The effects that may be obtained by the present invention are not limited to the above-mentioned effects, and other effects not mentioned above will be clearly understood by those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 11 is a diagram showing contents of an EDMG Header-A field for MU-MIMO proposed by the present invention;

FIG. 12 is a diagram showing contents of an EDMG Header-A field for FDMA proposed by the present invention.

BEST MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, a detailed description will be given of the introduction of the concept of a downlink oriented channel, and a method and apparatus for conducting communication using a downlink oriented channel in a high-density Wireless Local Area Network (WLAN) system.

1. Wireless LAN (WLAN) System 1-1. Generals of WLAN System

Figure 1:
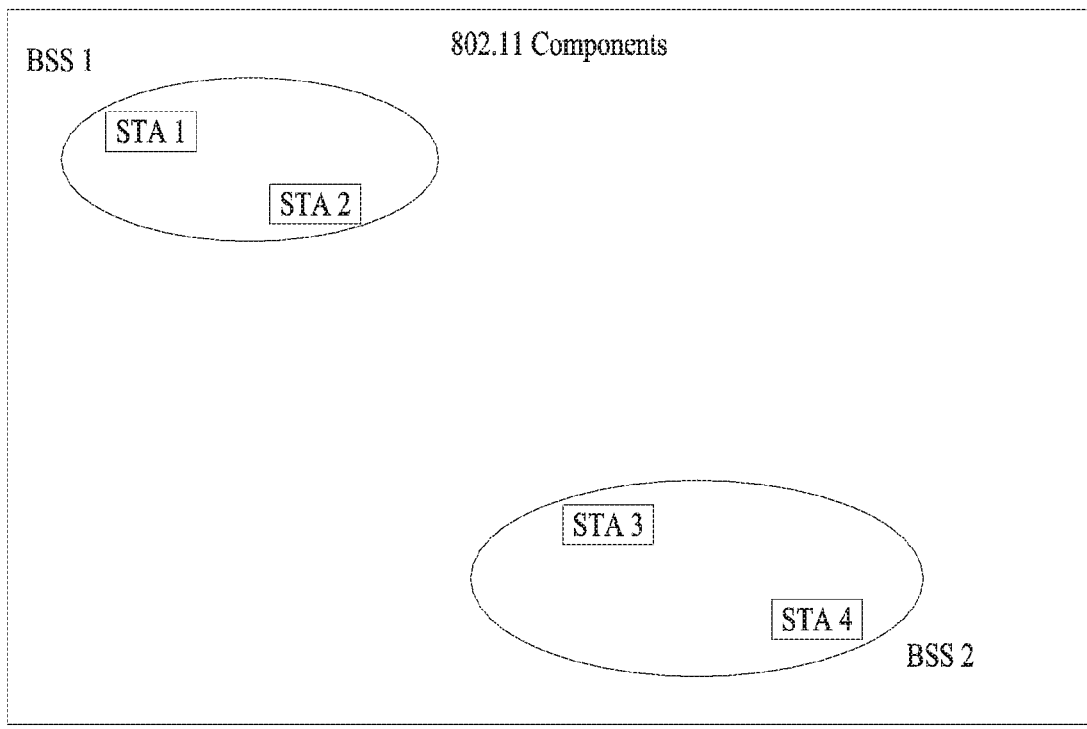
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
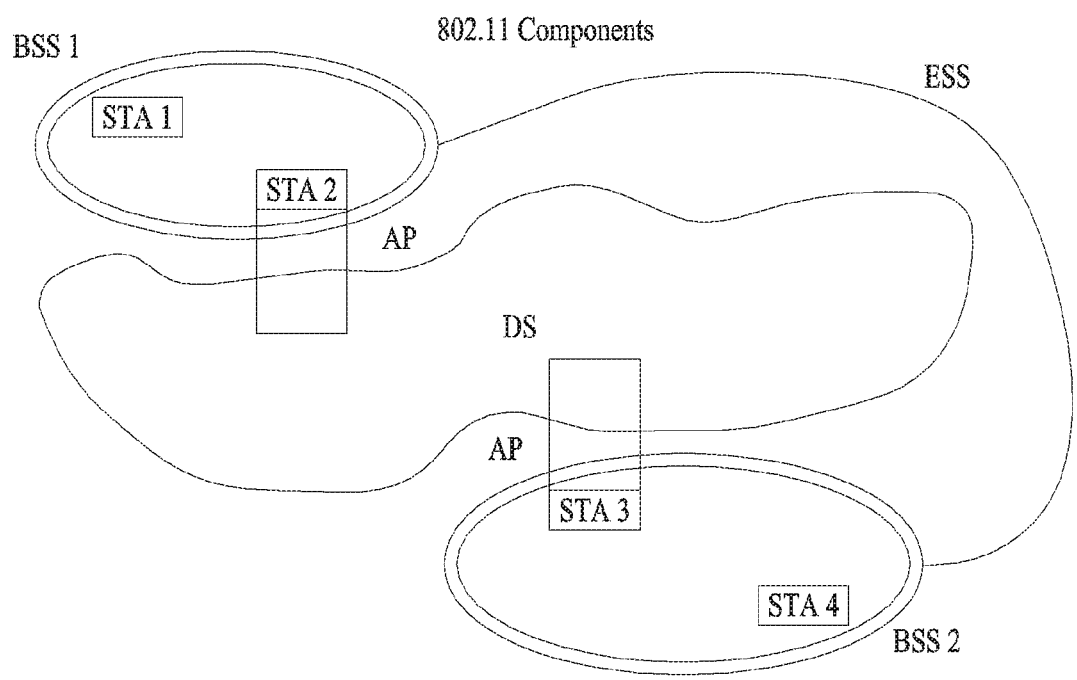
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above, a method of channel bonding in the WLAN system will be described.

1-2 Channel Bonding in WLAN System

Figure 3:
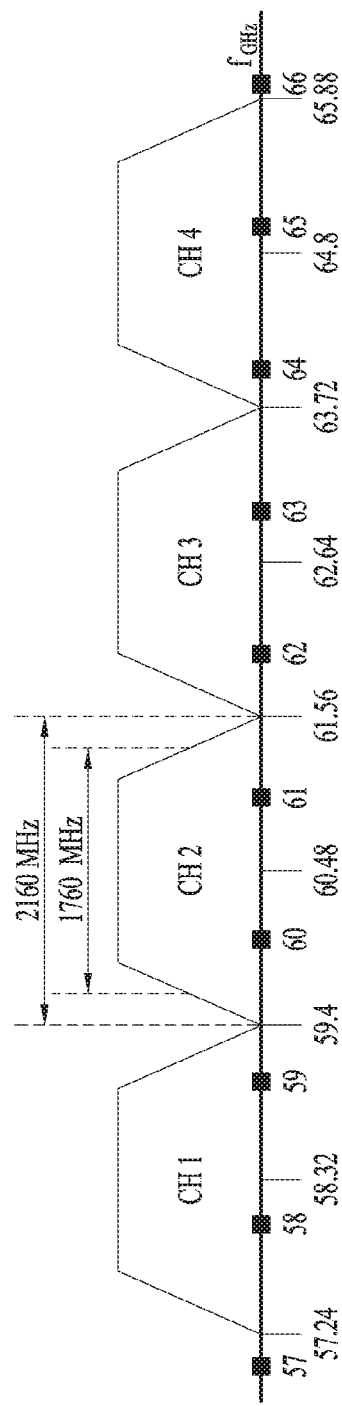
FIG. 3 is a diagram illustrating a channel in a 60 GHz band for explaining a channel bonding operation according to an embodiment of the present invention.

FIG. 3 is a diagram illustrating a channel in a 60 GHz band for explaining a channel bonding operation according to an embodiment of the present invention.

As shown in FIG. 3, four channels may be configured in the 60 GHz band, and the typical channel bandwidth may be 2.16 GHz. The ISM band (57 GHz to 66 GHz) available at 60 GHz may be specified differently for different countries. In general, channel 2 of the channels shown in FIG. 3 is available in all regions and may be used as a default channel. Most of the regions, except Australia, may use channels 2 and 3, which may be utilized for channel bonding. However, the channels used for channel bonding may vary, and the present invention is not limited to a specific channel.

Figure 4:
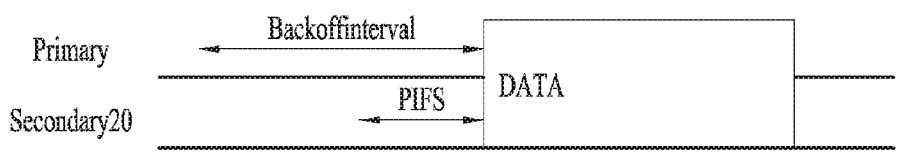
FIG. 4 illustrates a basic method of performing channel bonding in a WLAN system.

FIG. 4 illustrates a basic method of performing channel bonding in a WLAN system.

The example of FIG. 4 illustrates the operation of 40 MHz channel bonding performed by combining two 20 MHz channels in the IEEE 802.11n system. For IEEE 802.11ac, 40/80/160 MHz channel bonding may be performed.

The two channels exemplarily shown in FIG. 4 include a primary channel and a secondary channel, and the STA may review the channel status of the primary channel of the two channels in the CSMA/CA manner. If the secondary channel is idle for a predetermined time (e.g., PIFS) while the primary channel is idle during a certain backoff interval and the backoff count becomes 0, the STA may transmit data by bonding the primary channel and the secondary channel.

In the case where channel bonding is performed based on contention as shown in FIG. 4, channel bonding is allowed only when the secondary channel remains idle for a predetermined time at the time when the backoff count for the primary channel expires, and therefore the application of channel bonding is very limited, and it is difficult to flexibly cope with the media situation.

Accordingly, in one aspect of the present invention, an AP may transmit scheduling information to STAs to perform access based on scheduling. Meanwhile, in another aspect of the present invention, channel access may be performed based on the above-described scheduling or on contention independently of the above-described scheduling. In yet another aspect of the present invention, communication may be performed based on beamforming using a spatial sharing technique.

1-3. Beacon Interval Configuration

Figure 5:
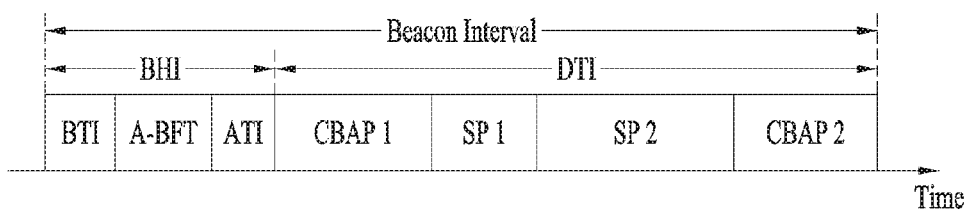
FIG. 5 is a diagram illustrating configuration of a beacon interval.

FIG. 5 is a diagram illustrating configuration of a beacon interval.

In 1 lad-based DMG BSS systems, the media time may be divided into beacon intervals. The sub-intervals within a beacon interval may be referred to as access periods. Different access intervals within one beacon interval may have different access rules. The information on the access intervals may be transmitted to a non-AP STA or a non-PCP by the AP or Personal Basic Service Set Control Point (PCP).

As shown in FIG. 5, one beacon interval may include one beacon header interval (BHI) and one data transfer interval (DTI). The BHI may include a beacon transmission interval (BTI), an association beamforming training (A-BFT) interval, and an announcement transmission interval (ATI) as shown in FIG. 4.

The BTI refers to an interval during which one or more DMG beacon frames may be transmitted. The A-BFT interval refers to an interval during which beamforming training is performed by an STA that has transmitted the DMG beacon frame during the preceding BTI. The ATI refers to a request-response-based management access interval between a PCP/AP and a non-PCP/non-AP STA.

Meanwhile, the data transfer interval (DTI) is an interval during which frame exchange is performed between STAs, and may be allocated one or more Contention Based Access Periods (CBAPs) and one or more service periods (SPs) as shown in FIG. 5. Although FIG. 5 illustrates an example of allocation of two CBAPs and two SPs, this is illustrative and not restrictive.

Hereinafter, the physical layer configuration in a WLAN system to which the present invention is applied will be described in detail.

1-4. Physical Layer Configuration

It is assumed that the following three different modulation modes may be provided in the WLAN system according to an embodiment of the present invention.

TABLE 1

| PHY | MCS | Note |
| --- | --- | --- |
| Control PHY | 0 | |
| Single carrier PHY (SC PHY) | 1 ... 12 25 ... 31 | (low power SC PHY) |
| OFDM PHY | 13 ... 24 | |

Such modulation modes may be used to satisfy different requirements (e.g., high throughput or stability). Depending on the system, only some of these modes may be supported.

Figure 6:
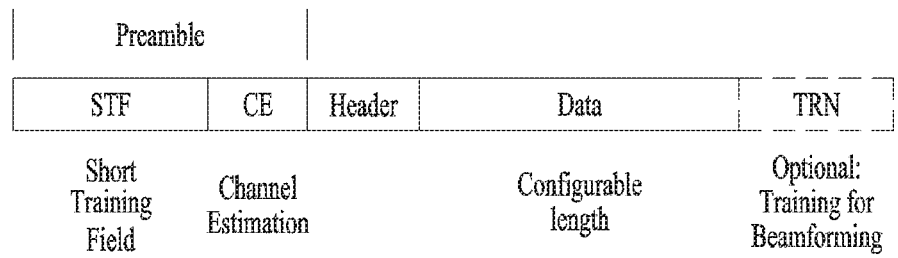
FIG. 6 is a diagram illustrating a physical configuration of an existing radio frame.

FIG. 6 is a diagram illustrating a physical configuration of an existing radio frame.

It is assumed that all the Directional Multi-Gigabit (DMG) physical layers include fields as shown in FIG. 6 in common. However, depending on the respective modes, physical layers may have a different method of defining individual fields and use a different modulation/coding scheme.

As shown in FIG. 6, the preamble of a radio frame may include a Short Training Field (STF) and Channel Estimation (CE). In addition, the radio frame may include a header and a data field as payload, and selectively include a TRN (Training) field for beamforming.

Figure 7:
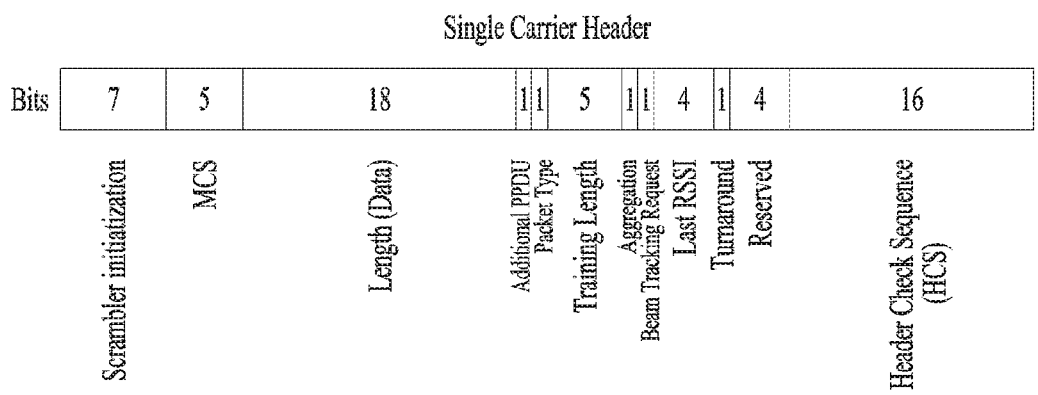
FIGS. 7 and 8 are diagrams illustrating configuration of the header field of the radio frame of FIG. 6.
Figures 8, 9:
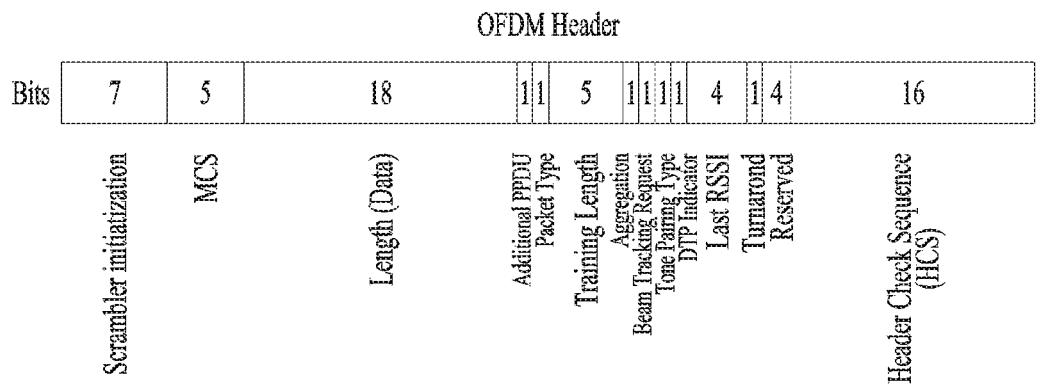
FIG. 9 is a diagram showing a PPDU structure applicable to the present invention.

FIGS. 7 and 8 are diagrams illustrating configuration of the header field of the radio frame of FIG. 6.

Specifically, FIG. 7 illustrates a case where a Single Carrier (SC) mode is used. In the SC mode, the header may include information indicating an initial value of scrambling, a Modulation and Coding Scheme (MCS), information indicating the length of data, information indicating the presence or absence of an additional Physical Protocol Data Unit (PPDU), a packet type, a training length, an aggregation status, a beam tracking request status, a last Received Signal Strength Indicator (RSSI), a truncation status, and a Header Check Sequence (HCS). In addition, as shown in FIG. 7, the header has 4 reserved bits. The reserved bits may be utilized in the following description.

FIG. 8 specifically illustrates configuration of a header in a case where the OFDM mode is applied. The OFDM header may include information indicating an initial value of scrambling, an MCS, information indicating the length of data, information indicating the presence or absence of additional PPDU, a packet type, a training length, an aggregation status, a beam tracking request status, a last RSSI, a truncation status, and an HCS. In addition, as shown in FIG. 8, the header has 2 reserved bits. The reserved bits may be utilized in the following description as in the case of FIG. 7.

As described above, the IEEE 802.11ay system is considering introduction of channel bonding and MIMO technology in the legacy 11ad system for the first time. In order to implement channel bonding and MIMO in 11ay, a new PPDU structure is needed. In other words, the existing 11ad PPDU structure has limitations in supporting legacy UEs and implementing channel bonding and MIMO.

For this, a legacy preamble for supporting a legacy UE and a new field for an 11ay UE following a legacy header field may be defined, and channel bonding and MIMO may be supported through the newly defined field.

FIG. 9 is a diagram showing a PPDU structure according to a preferred embodiment of the present invention. In FIG. 9, the abscissa may correspond to the time domain, and the ordinate may correspond to the frequency domain.

When two or more channels are bonded, a frequency band (for example, a 400 MHz band) may exist between frequency bands (e.g., 1.83 GHz) used in the respective channels. In the mixed mode, a legacy preamble (legacy STF, legacy CE) is transmitted in duplicate through each channel. In an embodiment of the present invention, transmitting the new STF and CE field (gap filling) preamble through the 400 MHz band between the channels along with transmission of the legacy preamble may be considered.

In this case, as shown in FIG. 9, in the PPDU structure according to the present invention, ay STF, ay CE, ay header B, and payload are transmitted over broadband after a legacy preamble, a legacy header and an ay header A. Therefore, the ay header, ay Payload field, and the like to be transmitted after the header field may be transmitted through channels used for bonding. In order to distinguish the ay header from the legacy header, the ay header may be referred to as an enhanced directional multi-gigabit (EDMG) header, or "ay header" and "EDMG header" may be interchangeably used.

For example, a total of six channels (2.16 GHz) may be present in 11ay, and up to four channels may be bonded and transmitted to a single STA. Thus, the ay header and the ay payload may be transmitted over bandwidths of 2.16 GHz, 4.32 GHz, 6.48 GHz, and 8.64 GHz.

Alternatively, the PPDU format used when the legacy preamble is repeatedly transmitted without performing the gap-filling described above may also be considered.

In this case, the gap-filling is not performed, and thus the ay STF, ay CE, and ay header B are transmitted in a wideband after the legacy preamble, legacy header, and ay header A, without the GF-STF and GF-CE field indicated by the dotted line in FIG. 9.

Figure 10:
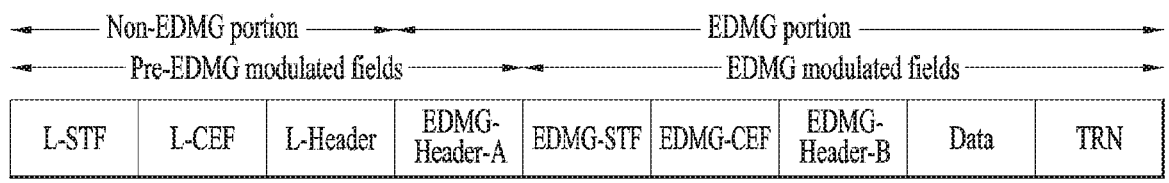
FIG. 10 is a diagram showing a PPDU structure applicable to the present invention.

FIG. 10 is a diagram showing a PPDU structure applicable to the present invention. The aforementioned PPDU format can be simply summarized as FIG. 10.

As shown in FIG. 10, a PPDU format applicable to 11ay system can include L-STF, L-CEF, L-Header, EDMG-Header-A, EDMG-STF, EDMG-CEF, EDMG-Header-B, Data, and TRN fields. The fields above can be selectively included according to a form (e.g., SU PPDU, MU PPDU, etc.) of a PPDU.

In this case, a portion including the L-STF, the L-CEF, and the L-header fields can be referred to as a non-EDMG portion and the remaining part can be referred to as an EDMG portion. And, the L-STF, the L-CEF, the L-header, and the EDMG Header-A fields can be referred to as pre-EDMG modulated fields and the remaining part can be referred to as EDMG modulated fields.

2. PHY Header Configuration Proposed by the Present Invention

Hereinafter, the configuration of a PHY header (e.g., (EDMG) Header-A) capable of supporting Multi-User (MU) operation in the 11ay system to which the present invention is applicable will be described.

The 11ay system to which the present invention is applicable can support the following operations as the MU operation: MU-MIMO operation and FDMA (or Orthogonal FDMA (OFDMA)) operation. To this end, the present invention separately proposes EDMG Header-A for MU-MIMO and EDMG Header-A for FDMA.

According to the present invention, an EDMG Header-A field may include a 1-bit indicator indicating whether a corresponding PPDU is either an MU-MIMO PPDU or an FDMA PPDU.

2.1. EDMG Header-A Configuration for MU-MIMO

In this section, the EDMG Header-A configuration for the MU-MIMO will be described in detail.

Considering operations of an STA or PCP/AP, among 112 bits allocated to the EDMG Header-A field, 14 bits except 98 bits can be used for the MU-MIMO.

For example, the following information may be included in the 98 bits.

TABLE 2

| Field name | Number of bits |
| --- | --- |
| SU/MU | 1 |
| Channel aggregation | 1 |
| BW | 8 |
| Primary channel number | 3 |
| GI/CP length | 2 |
| Beamformed | 1 |
| LDPC length | 1 |
| STBC | 1 |
| AID | 64 (for 8 STAs) |
| CRC | 16 |
| Sum | 98 |

If 8 streams need to be supported for each STA operating in MU-MIMO mode, a total of 24 bits (i.e., 3 bits (8 streams)*8 (No. STA)=24 bits) are required, which is more than the above-described 14 bits. In addition, if 4 streams need to be supported per STA, a total of 16 bits (i.e., 2 bits (4 streams)*8 (No. STA)=16 bits) are required, which is also more than the above-described 14 bits.

Thus, it may be reasonable that 2 streams are provided per STA. That is, when 2 streams are supported per STA, a total of 8 bits are required. Therefore, the maximum number of (spatial) streams that an EDMG AP or PCP/AP can support may become 16.

Accordingly, when there are 8 STAs, a total of 72 bits (including an Association ID (AID) of each STA (64 bits)) may be used as information for the MU-MIMO as shown in Table 3.

TABLE 3

| MU-MIMO (Total: 72 bits) | | | | | | | |
|---|---|---|---|---|---|---|---|
| STA 1 | | STA 2 | | STA 3 | | STA 4 | |
| AID | Nss | AID | Nss | AID | Nss | AID | Nss |
| 8 bits | 1 bit | 8 bits | 1 bit | 8 bits | 1 bit | 8 bits | 1 bit |
| STA 5 | | STA 6 | | STA 7 | | STA 8 | |
| AID | Nss | AID | Nss | AID | Nss | AID | Nss |
| 8 bits | 1 bit | 8 bits | 1 bit | 8 bits | 1 bit | 8 bits | 1 bit |

Accordingly, the EDMG Header-A for the MU-MIMO proposed by the present invention can be configured as shown in FIG. 11.

FIG. 11 illustrates contents of the EDMG Header-A field for the MU-MIMO proposed by the present invention.

As shown in FIG. 11, the EDMG Header-A field proposed by the present invention may be composed of a total of 112 bits. In this case, the EDMG Header-A field may include a 1-bit indicator indicating whether a corresponding PPDU is for either the MU-MIMO or FDMA.

In addition, the EDMG Header-A field may include a total of 8 SS Descriptor Set fields, and each SS Descriptor Set field may be composed of 9 bits.

In this case, each SS Descriptor Set field may indicate a Spatial Stream (SS) allocated to a corresponding STA.

The SS Descriptor Set field may include an 8-bit AID field and a 1-bit Number of SS (Nss) field as shown in Table 3. If the Nss field is set to '0', it may indicate a single stream. And, if the Nss field is set to '1', it may indicate a double stream.

In addition, the EDMG Header-A field may include a 16-bit Cyclic Redundancy Check (CRC).

Moreover, according to the present invention, the individual contents of the EDMG Header-A field may be positioned in the height direction of the bit domain as shown in FIG. 11. Specifically, the MU-MIMO/FDMA indication field in the EDMG Header-A field may be located prior to the 8 SS Descriptor Set fields in the bit domain.

Hereinafter, the EDMG Header-A configuration for the FDMA will be described in detail.

2.2. EDMG Header-A Configuration for FDMA

The 1 lay system to which the present invention is applicable supports channel-wise FDMA. In other words, the maximum number of STAs for the FDMA may be limited by the number of used channels.

Since the 1 lay system to which the present invention is applicable can perform channel bonding for a maximum of 4 channels, the maximum number of STAs for the FDMA is assumed to be 4. In addition, it is assumed that 4 bits are used to signal resource (channel) allocation for each STA.

In this case, each STA may have a maximum of 8 streams (each of which is composed of 3 bits).

Alternatively, in the above-described MU-MIMO case, if the maximum number of (spatial) streams that an EDMG AP or PCP/AP can support is considered, each STA may have a maximum of 4 streams (each of which is composed of 2 bits). Therefore, the number of bits required when 4 streams are respectively provided to 4 STAs for the FDMA may be equal to the number of bits required when 2 streams are respectively provided to 8 STAs for the MU-MIMO.

Alternatively, to set the maximum number of streams that each STA can use equal to that in the above-described MU-MIMO case (i.e., 2 streams), 1-bit information may be allocated so that a maximum of 2 streams may be provided to 4 STAs for the FDMA, respectively.

In addition, the EDMG Header-A field may include a Beamformed field, which is independent for each STA to which the FDMA is applied, and the Beamformed field may be composed of 1 bit.

Since precoding may be applied to an EDMG Header-B field and different precoding may be applied to channels allocated for individual STAs, the Beamformed field may be included in the EDMG Header-A field rather than EDMG Header-B field.

Thus, when there are 4 STAs, a total of 60 bits (including an AID of each STA (8 bits)) may be used as information for the FDMA as shown in Table 4.

TABLE 4

| | STA 1 | | | | STA 2 | | | | STA 3 | | | | STA 4 | | | |
|---|---|---|---|---|---|---|---|---|---|---|---|---|---|---|---|---|
| | AID | RA | Nss | BF | AID | RA | Nss | BF | AID | RA | Nss | BF | AID | RA | Nss | BF |
| FDMA (Total 60 bits) | 8 bits | 4 bits | 2 bits | 1 bit | 8 bits | 4 bits | 2 bits | 1 bit | 8 bits | 4 bits | 2 bits | 1 bit | 8 bits | 4 bits | 2 bits | 1 bit |

Thus, the EDMG Header-A for the FDMA proposed by the present invention can be configured as shown in FIG. 12.

FIG. 12 illustrates contents of the EDMG Header-A field for the FDMA proposed by the present invention.

As shown in FIG. 12, the EDMG Header-A field proposed by the present invention may be composed of a total of 112 bits. In this case, the EDMG Header-A field may include a 1-bit indicator indicating whether a corresponding PPDU is for either the MU-MIMO or FDMA.

In addition, the EDMG Header-A field may include a total of 4 RA Descriptor (or Channel Description) fields, and each RA Descriptor field may be composed of 15 bits.

In this case, each RA Descriptor field may indicate a channel allocated to a corresponding STA.

The RA Descriptor field may include an AID field, a Number of SS (Nss) field, and a Beamformed field as shown in Table 4. In this case, the AID field, Nss field, and the Beamformed field may include 8 bits, 2 bits, and 3 bits, respectively.

As another example, the Nss field may be composed of 3 bits.

Additionally, the EDMG Header-A field may include a 16-bit Cyclic Redundancy Check (CRC).

Moreover, according to the present invention, the individual contents of the EDMG Header-A field may be positioned in the height direction of the bit domain as shown in FIG. 12. Specifically, the MU-MIMO/FDMA indication field in the EDMG Header-A field may be located prior to the 4 RA Descriptor field in the bit domain.

According to the present invention, a header field may have different fields depending on whether a PPDU is either an MU-MIMO format or an FDMA format as described above. Hereinafter, a method for transmitting and receiving signals based on the header field will be described.

When the PPDU is the MU-MIMO format, a signal is transmitted based on stream allocation information indicated by the header field. On the other hand, when the PPDU is the FDMA format, a signal is transmitted based on channel allocation information indicated by the header field.

To this end, the header field may include a 1-bit indicator indicating whether the PPDU is either the MU-MIMO format or the FDM format.

In particular, when the PPDU is the MU-MIMO format, the header field may include SS Descriptor Set fields for a plurality of second STAs. Specifically, the header field may include a maximum of 8 SS Descriptor Set fields.

In this case, the SS Descriptor Set field may include an 8-bit Association ID (AID) field and a 1-bit Number of SS (Nss) field.

Meanwhile, when the PPDU is the FDMA format, the header field may include Channel Descriptor fields for a plurality of second STAs. Specifically, the header field may include a maximum of 4 Channel Descriptor fields.

In this case, the Channel Descriptor field may include an 8-bit Association ID (AID) field and a 1-bit Beamformed field.

Moreover, when the PPDU is the MU-MIMO format, the header field may further include an SU/MU field indicating whether the PPDU is either a Single-User (SU) PPDU or a Multi-User (MU) PPDU, a Primary Channel field indicating a primary channel, a Bandwidth field indicating a bandwidth, and a 16-bit Cyclic Redundancy Check (CRC).

Further, when the PPDU is the FDMA format, the header field may further include an SU/MU field indicating whether the PPDU is either a Single-User (SU) PPDU or a Multi-User (MU) PPDU and a 16-bit Cyclic Redundancy Check (CRC).

3. Device Configuration

Figure 13:
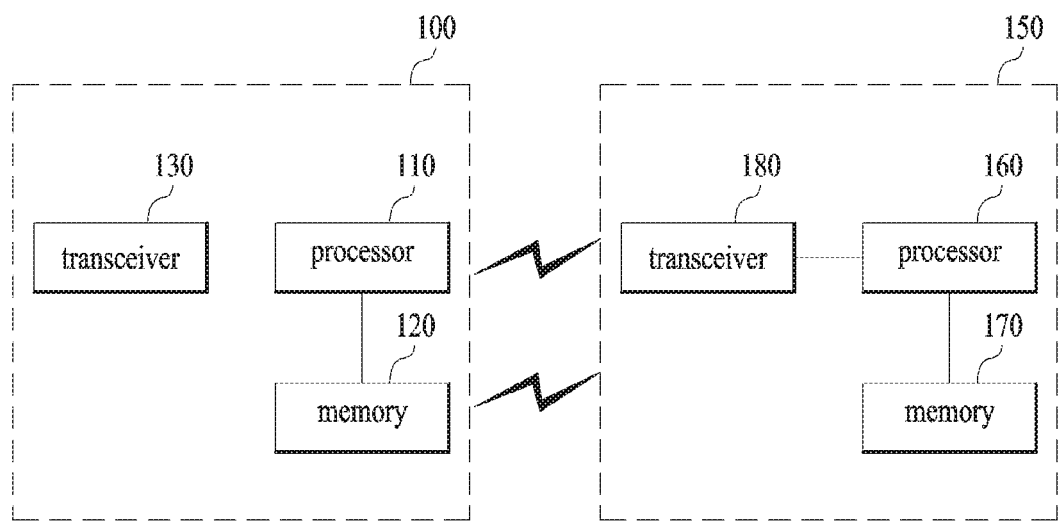
FIG. 13 is a diagram showing devices for implementing the aforementioned methods.

FIG. 13 is a diagram illustrating devices for implementing the above-described method.

In FIG. 13, a wireless device 100 may correspond to a station configured to transmit a signal using the aforementioned EDMG Header-A field in the foregoing description and a wireless device 150 may correspond to a station configured to receive a signal using the aforementioned EDMG Header-A field in the foregoing description. In this case, each of the stations may correspond to an 11ay UE or a PCP/AC. In the following description, for clarity, a station transmitting a signal is referred to as a transmitting device 100 and a station receiving a signal is referred to as a receiving device 150.

The transmitting device 100 may include a processor 110, a memory 120 and a transceiver 130. The receiving device 150 may include a processor 160, a memory 170, and a transceiver 180. The transceivers 130 and 180 may transmit/receive wireless signals and may be implemented in a physical layer such as IEEE 802.11/3GPP. The processors 110 and 160 are implemented in the physical layer and/or MAC layer and are connected to the transceivers 130 and 180.

The processors 110 and 160 and/or the transceivers 130 and 180 may include application specific integrated circuits (ASICs), other chipsets, logic circuits, and/or data processors. The memories 120 and 170 may include a read-only memory (ROM), a random access memory (RAM), a flash memory, a memory card, a storage medium and/or other storage units. When an embodiment is executed by software, the method described above may be executed as a module (e.g., a process, a function) that performs the functions described above. The module may be stored in the memory 120,170 and executed by the processor 110,160. The memory 120, 170 may be located inside or outside the processor 110, 160 and may be connected to the processor 110, 160 by a well-known means.

The detailed description of preferred embodiments of the invention set forth above is provided to enable those skilled in the art to implement and practice the invention. Although the present invention has been fully described by way of example with reference to the accompanying drawings, it is to be understood that various modifications and changes may be made in the invention without departing from the scope and spirit of the invention. Accordingly, the present invention is not intended to be limited to the embodiments disclosed herein but is to be accorded the widest scope consistent with the principles and novel features disclosed herein.

INDUSTRIAL APPLICABILITY

Although it is explained that the present invention is applied to IEEE 802.11 based wireless LAN system, by which the present invention may be non-limited. The present invention can be applied to various wireless systems capable of performing data transmission based on channel bonding using the same method.

What is claimed is:

1. A method of transmitting a signal by a first station (STA) to a plurality of second STAs in a Wireless Local Area Network (WLAN) system, the method comprising:
    transmitting, to the plurality of second STAs, a header field including an spatial stream (SS) Descriptor Set field for each STA of the plurality of second STAs,
    wherein the header field includes a maximum of 8 SS Descriptor Set fields,
    wherein the SS Descriptor Set field includes an 8-bit Association ID (AID) field and a 1-bit Number of SS (Nss) field; and
    transmitting the signal for a Multi User-Multiple Input Multi Output (MU-MIMO) to the plurality of second STAs based on stream allocation information indicated by the header field.

2. The method of claim 1, wherein the header field further includes:
    an SU/MU field indicating whether a Physical Protocol Data Unit (PPDU) is either a Single-User (SU) PPDU or a Multi-User (MU) PPDU;
    a Primary Channel field indicating a primary channel;
    a Bandwidth field indicating a bandwidth; and
    a 16-bit Cyclic Redundancy Check (CRC).

3. A method of receiving a signal by a first station (STA) from a second STA in a Wireless Local Area Network (WLAN) system, the method comprising:

receiving, from the second STA, a header field including an spatial stream (SS) Descriptor Set field for each STA of a plurality of second STAs, wherein the header field includes a maximum of 8 SS Descriptor Set fields, wherein the SS Descriptor Set field includes an 8-bit Association ID (AID) field and a 1-bit Number of SS (Nss) field; and receiving the signal for a Multi User-Multiple Input Multi Output (MU-MIMO) from the second STA based on stream allocation information indicated by the header field.

4. A first station (STA) device for transmitting a signal in a Wireless Local Area Network (WLAN) system, the first STA device comprising:

a transceiver configured to transmit and receive signals to and from a plurality of second STAs with at least one Radio Frequency (RF) chain; and a processor connected to the transceiver and configured to process the signals transmitted and received to and from the plurality of second STAs, wherein the processor is configured to:

transmit, to the plurality of second STAs, a header field an spatial stream (SS) Descriptor Set field for each of the plurality of second STAs, wherein the header field includes a maximum of 8 SS Descriptor Set fields, wherein the SS Descriptor Set field includes an 8-bit Association ID (AID) field and a 1-bit Number of SS (Nss) field; and transmit the signal for a Multi User-Multiple Input Multi Output (MU-MIMO) to the plurality of second STAs based on stream allocation information indicated by the header field.

5. A first station (STA) device for receiving a signal in a Wireless Local Area Network (WLAN) system, the first STA device comprising:

a transceiver configured to transmit and receive signals to and from a second STA with at least one Radio Frequency (RF) chain; and a processor connected to the transceiver and configured to process the signals transmitted and received to and from the second STA, wherein the processor is configured to:

receive, from the second STA, a header field an spatial stream (SS) Descriptor Set field for each STA of a plurality of second STAs, wherein the header field includes a maximum of 8 SS Descriptor Set fields, wherein the SS Descriptor Set field includes an 8-bit Association ID (AID) field and a 1-bit Number of SS (Nss) field; and receive the signal for a Multi User-Multiple Input Multi Output (MU-MIMO) from the second STA based on stream allocation information indicated by the header field.

* * * * *